May 26, 1936.  W. R. SCHLAGE  2,042,024
STRIKE PLATE
Filed Oct. 3, 1933   3 Sheets-Sheet 1
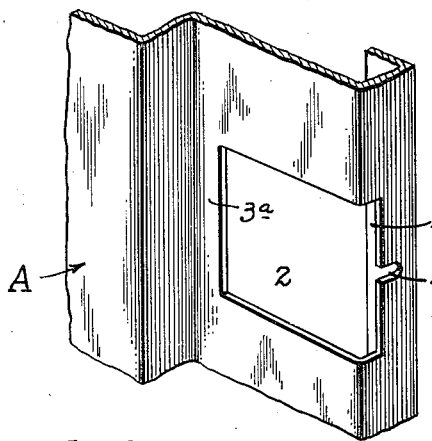
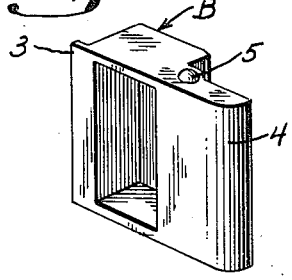
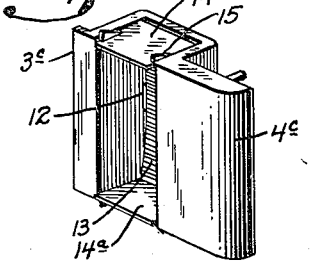
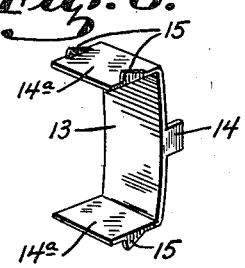
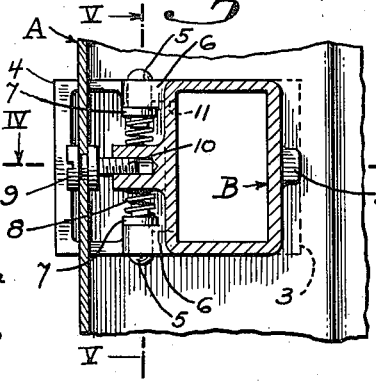
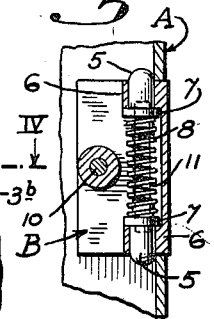
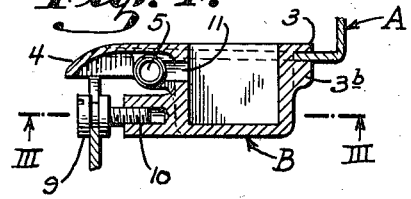
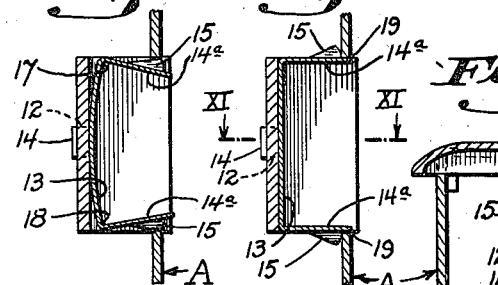
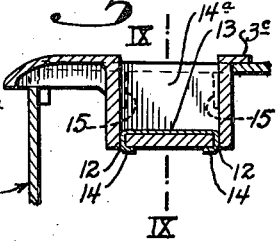
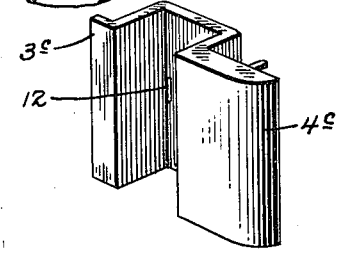
INVENTOR.
Walter R. Schlage.
BY
Townsend & Loftus.
ATTORNEYS.

May 26, 1936. W. R. SCHLAGE 2,042,024
STRIKE PLATE
Filed Oct. 3, 1933 3 Sheets-Sheet 2
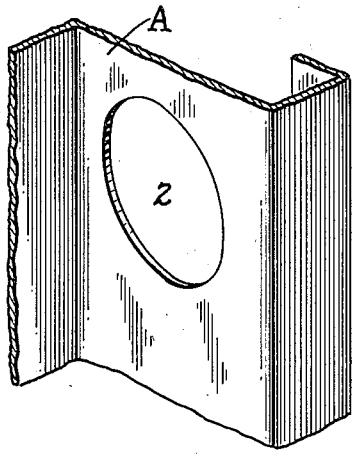
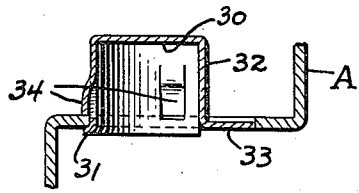
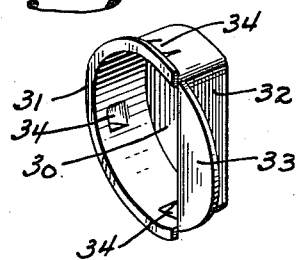
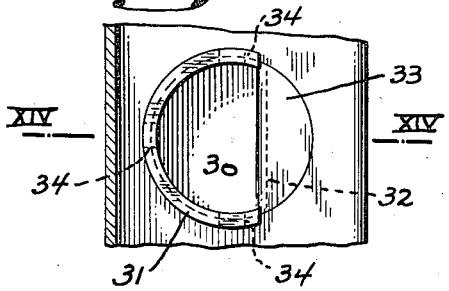
INVENTOR.
Walter R. Schlage.
BY
Townsend & Loftus.
ATTORNEYS.

May 26, 1936. W. R. SCHLAGE 2,042,024
STRIKE PLATE
Filed Oct. 3, 1933 3 Sheets-Sheet 3
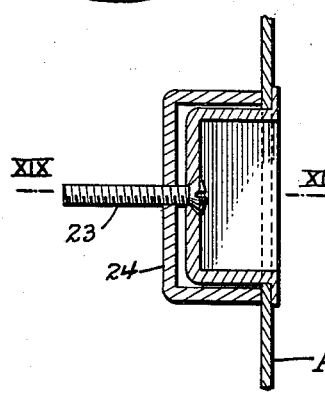
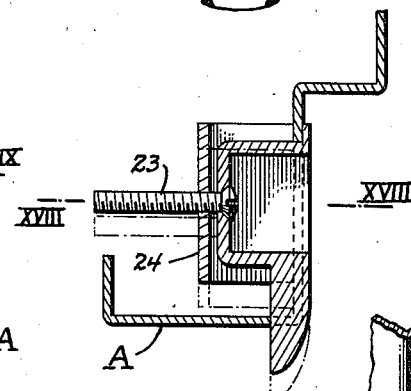
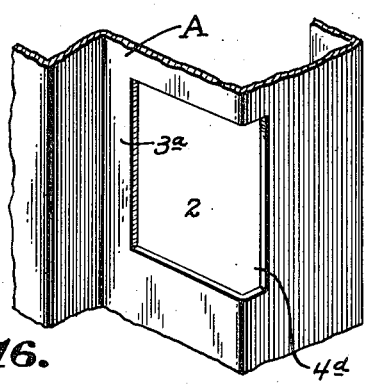
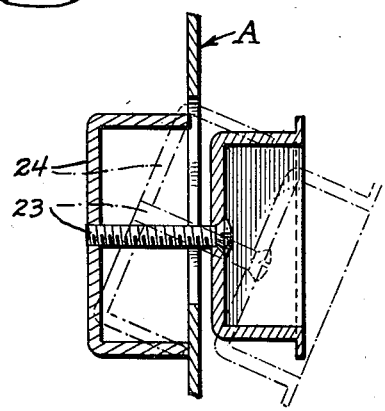
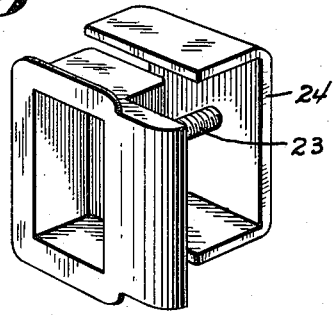
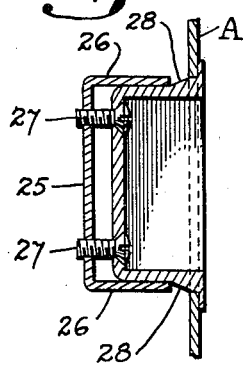
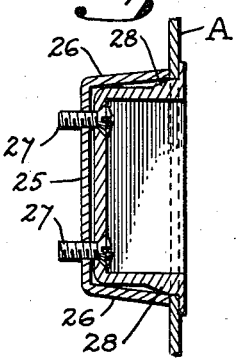
INVENTOR.
Walter R. Schlage.
BY Townsend & Loftus.
ATTORNEYS.

Patented May 26, 1936

2,042,024

UNITED STATES PATENT OFFICE 2,042,024

STRIKE PLATE

Walter R. Schlage, San Francisco, Calif., assignor to Schlage Lock Company, San Francisco, Calif., a corporation of California Application October 3, 1933, Serial No. 691,955

7 Claims. (Cl. 292—340)

This invention relates to striker plates and especially to means for securing striker plates in hollow metal door jambs.

In many buildings and other structures, metal frames or jambs are becoming extensively employed, both in connection with metal doors and with doors constructed partially of metal and some other material, such as wood; for instance, such as automobile door and body structures, and the like. Such doors or jambs are usually built or formed from sheet metal, or comparatively thin steel. Doors and jambs of this character require door locks and striker plates just like other doors, but it is necessary to punch, grill, or otherwise provide openings before the locks and striker plates can be inserted; and after insertion there still remains the problem of rigidly securing the members in place, this being particularly true as regards the striker plate, as the metal forming the jamb is often too thin to permit drilling and tapping for the reception of screws, etc.

The object of the present invention is generally to improve and simplify the construction and operation of structures of the character described; to provide a simple method of inserting and securing striker plates in hollow metal jambs; to provide a securing means which also acts to reinforce and strengthen the punched portion of the jamb in which the striker plate is inserted; to provide means carried by the strike plate itself for securing the same against removal; and further to provide securing means which can be released if it is desired to remove the strike plate for inspection, repair, etc.

The strike plate is shown by way of illustration in the accompanying drawings, in which—

Fig. 1 is a perspective view of a portion of a metal door jamb, showing the manner in which it is cut away from the opening for the reception of a strike plate;

Fig. 2 is a perspective view of a strike plate;

Fig. 3 is a section of the strike plate taken on line III—III of Fig. 4;

Fig. 4 is a section taken on line IV—IV of Fig. 3;

Fig. 5 is a section taken on line V—V of Fig. 3;

Fig. 6 is a perspective view showing another form of strike plate;

Fig. 7 is a view similar to Fig. 6, showing the resilient securing member removed;

Fig. 8 is a perspective view of a resilient securing member used in conjunction with the strike plate shown in Figs. 6 and 7;

Fig. 9 is a longitudinal section of the type of strike plate shown in Fig. 6, but taken on line IX—IX of Fig. 11;

Fig. 10 is a view similar to Fig. 9, showing the resilient securing means in securing position;

Fig. 11 is a section taken on line XI—XI of Fig. 10;

Fig. 12 is a perspective view, showing a portion of a metal door jamb and the manner in which it is cut away from an opening for the reception of a strike plate of the type shown in Figs. 13, 14, and 15;

Fig. 13 is a perspective view of a substantially cylindrical shaped form of strike plate;

Fig. 14 is a section taken on line XIV—XIV of Fig. 15;

Fig. 15 is a plan view of the strike plate, showing it inserted in position in the door jamb;

Fig. 16 is a perspective view, showing another form of strike plate, together with a clamping member cooperating therewith;

Fig. 17 is a perspective view of a portion of a metal door jamb, showing the manner in which it is cut away to receive the type of strike plate shown in Fig. 16;

Fig. 18 is a section taken on line XVIII—XVIII of Fig. 19;

Fig. 19 is a section taken on line XIX—XIX of Fig. 18.

Fig. 20 is a sectional view similar to Fig. 18, showing the manner in which the strike plate and its cooperating clamping member are inserted in the jamb; and Figs. 21 and 22 are sectional views showing still another form of striker plate.

Referring to the drawings in detail, particularly Figs. 1 to 5, inclusive, A indicates a portion of a metal door jamb, and 2 an opening formed therein by punching, cutting, or otherwise. The opening is provided for the reception of the strike plate, and one form of strike plate is shown in perspective view in Fig. 2.

The plate consists of a rectangular body member B, which is hollow to receive the latch bolt of a door lock. The rear side is provided with an inwardly projecting flange 3 and the front side is provided with a flange or rounded lip 4 which is engaged by the inclined face of a latch bolt when a door is being closed. Mounted under the lip 4, or on the rear side thereof, are a pair of spring detents, generally indicated at 5, 5. These detents are slidably mounted in lugs 6 formed on the rear side of the strike plate. The inner ends of the detents are headed as shown at 7, and a spring 8 engages the heads and normally functions to maintain the detents in projected position.

When a strike plate of the type shown in Figs.

2 to 5, inclusive, is to be inserted in an opening 2 of a door jamb of the type shown in Fig. 1, it is only necessary to depress the detents 5, 5, and to place the body portion B of the strike plate in the opening 2 in such a position that the flange 3 will rest on the surface indicated at 3a and will there be held in place by a bottom lug 3b (see Fig. 4). In this position the detents 5 will project in under the surface of the opening 2, or in other words engage the inner face of the metal forming the jamb, and the lip 4 will project through that portion of the opening which is formed in the edge of the jamb, as clearly shown at 4a (see Fig. 1). This portion is also slotted, as indicated at 4b, and this slot functions to receive the screw head 9 of an adjusting screw which has a threaded engagement with a lug formed on the rear side of the strike plate, as indicated at 10. (See Fig. 3). The screw head is grooved to enter the slot 4b when the strike plate is inserted, and the screw is thus secured against endwise movement with relation to the jamb. However, when a screw driver or like implement is inserted and the screw is rotated, the strike plate will move toward or away from the edge of the jamb and may thus be adjusted to receive the latch bolt of the door mounted in the jamb.

The operation of inserting the strike plate is very quick as it is accomplished by merely depressing or applying sufficient pressure to the strike plate when it is placed in the opening 2 to cause the detents to be forced inwardly, and the moment the strike plate finds its seat, the detents will be automatically projected and the plate will be secured. If at any time it is necessary to remove the strike plate for inspection, repair, or otherwise, a slot 11 (see Figs. 3 and 4) is formed just behind the lip 4 within the hollow body member B. This slot extends substantially from end to end of the body member B, or at least to a point beyond the heads 7 of the detents. Thus by inserting a sharp implement in the slot behind the heads, the detents may be retracted and the strike plate is thus free to be lifted out of the opening.

In Figs. 6 to 11, inclusive, another form of strike plate and securing means is shown. The strike plate is best illustrated in Fig. 7. It may be cast or may be formed of stamped or pressed metal, as desired. It is elongated in form and the pocket which receives the latch bolt of the cooperating door is open at the ends. The center and inner portion of the strike plate shown in Figs. 7 and 11 is provided with slots 12 on opposite sides, and these are provided to receive and secure a spring plate generally shown in Fig. 8. The spring plate consists of a bottom section 13 having a pair of lugs 14 which are adapted to be passed through the slots 12 and then bent over, as shown in Fig. 11, to secure the spring plate to the strike plate. The ends of the spring plate 13 are provided with upright end sections 14a, 14a, and these are provided with retaining or securing lugs 15, 15. The striker plate with the spring plate mounted therein is shown in Fig. 6, and also in Figs. 9, 10, and 11. The strike plate is inserted into an opening formed in a door jamb similar to that shown in Fig. 17, the shoulder 3c of the strike plate resting on the inner surface 3a, the lip 4c resting on the shoulder 4d formed in the edge of the door jamb when the strike plate is fully inserted. The ends 14a of the spring plate will then assume the position shown in Fig. 9, but by inserting a screw driver, or any other blunt implement, at the points indicated at 17 and 18, the bottom portion of the plate 14 is flattened out and the ends 14a will spring outwardly and cause the lugs 15 to engage the under side or inner surface of the metal jamb, as clearly shown in Fig. 10; and when this is accomplished, the strike plate is fully inserted and secured. It is, however, possible to remove it for inspection or repair, if desired, by inserting a sharp implement at the points indicated at 19, that is, the pointed end of the screw driver, or the like, when inserted at these points, will wedge itself between the metal of the door jamb and the spring ends 14a, 14a, and thus force them inwardly a sufficient distance so that the lugs 15 will clear themselves and finally assume the position shown in Fig. 9, and in this position the strike plate can be lifted bodily out of the opening.

The two types of strike plate so far described are, in both instances, secured by resilient projectable members, the first type having detents 5 which are projected by a spring 8, and the second type having spring ends 14a and retaining lugs 15 to secure the strike plate in the opening of the door jamb.

In Figs. 17 to 20, inclusive, a still different form is shown, and in place of employing a resilient projectable securing member, a clamping member is employed. The strike plate in its construction is clearly shown in Fig. 16; in fact, it is substantially identical to the type shown in Fig. 2. A hole is, however, formed in the bottom of the strike plate and a screw 23 passes therethrough. On this screw is carried a U-shaped clamping member 24. When the strike plate is to be inserted in the opening shown in Fig. 17, the U-shaped clamp will assume a position at the outer end of the screw 23 (see Figs. 16 and 20). In this position it is possible to tilt the U-shaped clamp so that it will pass through the opening (see Fig. 20). After it is inserted the strike plate is moved into alignment with the opening and then pushed inwardly until the supporting flanges secure it against further movement. The screw is then tightened or screwed inwardly and while this is being done, the clamp 24 is drawn towards the bottom of the strike plate and finally engages the inner surface of the jamb, as shown in Figs. 18 and 19, thus rigidly securing the strike plate and at the same time permitting removal thereof if necessary.

A combination spring and clamping action is shown in still another form of strike plate shown in Figs. 21 and 22. A U-shaped clamping member is again employed, as indicated at 25, but the end sections thereof, indicated at 26, are slightly resilient. Two screws extend through the bottom of the strike plate, as shown at 27, and a pair of inclined faces 28 are formed on the ends of the strike plate. When the strike plate is inserted in the opening of the door jamb, the U-shaped member assumes the position shown in Fig. 21. After insertion the U-shaped clamp is pulled up by the screws 27, and as they are being pulled up they engage the inclined faces 28 which spreads them and forces them into engagement with the inner surface of the jamb, thus rigidly clamping and securing the strike plate in position and at the same time permitting release or removal whenever necessary.

Another form of my invention is shown in Figs. 12 to 15. The type of strike plate shown is substantially circular in formation and so is the hole which is formed in the door jamb. The strike plate resembles a cup having a bottom portion 30. The open end is flanged as shown at 31, and this flange is adapted to seat against the outer surface of the jamb. The cup is flattened on one side, as shown at 32, to receive the flat side of a latch bolt, but an extension lip 33 is provided to fill in this portion of the opening in the jamb and also to form a lip for the latch to engage when the door is being closed. A plurality of resilient spring fingers are pressed out of the side wall forming the cup, as indicated at 34. These yield inwardly when the cup is being inserted but the moment the cup is fully inserted, they will spring outwardly and engage the other surface of the metal jamb. This type is exceedingly simple and cheap to manufacture, but it is not readily removable once inserted as it is difficult to withdraw the resilient prongs or fingers 34.

While certain features of my invention have been more or less specifically described, I wish it understood that various changes may be resorted to within the scope of the appended claims; similarly, that the materials and finish of the several parts employed may be such as the manufacturer may dictate or varying conditions may demand.

Having thus described my invention, what I claim and desire to secure by Letters Patent is—

1. The combination with a metal door jamb having an opening formed therein, of a strike plate insertable in said opening, a slidable member mounted in each end of the strike plate, and springs engaging said members and normally projecting them outwardly from the ends of the strike plate, said members being yieldable and retractable when the strike plate is inserted in the opening in the jamb and automatically projected by the springs to engage the inner face of the jamb when the strike plate is fully inserted.

2. The combination with a metal door jamb having an opening formed therein, of a strike plate insertable in said opening, a slidable member mounted in each end of the strike plate, and springs engaging said members and normally projecting them outwardly from the ends of the strike plate, said members being yieldable and retractable when the strike plate is inserted in the opening in the jamb and automatically projected by the springs to engage the inner face of the jamb when the strike plate is fully inserted, said members being wedge-shaped at their outer ends to pull the strike tightly against the outer face of the jamb.

3. The combination with a metal door jamb having an opening formed therein, of a strike plate insertable in said opening and a spring projected pin in each end of the strike plate, said pins being yieldable and retractable when the strike plate is inserted in the opening in the jamb and being automatically projected by spring action to engage the inner face of the jamb when the strike plate is fully inserted.

4. The combination with a metal door jamb having an opening formed therein, of a strike plate insertable in said opening, a pin disposed at each end of the strike plate, each pin having an outer rounded portion projecting beyond the ends of the strike plate, a head member on the inner end of each pin to limit outward movement of the pin, and a spring interposed between the pins, said spring permitting yielding and retraction of the pins when the strike plate is inserted in the opening in the jamb and said spring automatically projecting the pins to engage the inner face of the jamb when the strike plate is fully inserted.

5. The combination with a metal door jamb having an opening formed therein, of a strike plate insertable in said opening, a slidable member mounted in each end of the strike plate, spring means engaging said members and normally projecting them outwardly from the ends of the strike plate, said members being yieldable and retractable when the strike plate is inserted in the opening in the jamb and automatically projected by the spring means to engage the inner face of the jamb when the strike plate is fully inserted, and other means carried by the strike plate and engageable with the inner face of the jamb to secure the strike plate against removal.

6. The combination with a metal door jamb having an opening formed therein, of a strike plate insertable in said opening, a slidable member mounted in each end of the strike plate, spring means engaging said members and normally projecting them outwardly from the ends of the strike plate, said members being yieldable and retractable when the strike plate is inserted in the opening in the jamb and automatically projected by the spring means to engage the inner face of the jamb when the strike plate is fully inserted, a lug on the strike plate engageable with the inner face of the jamb, and means for imparting lateral movement to the strike plate after insertion in the jamb to move the lug into or out of engagement with the jamb.

7. The combination with a metal door jamb having an opening formed therein, of a strike plate insertable in said opening, a slidable member mounted in each end of the strike plate, spring means engaging said members and normally projecting them outwardly from the ends of the strike plate, said members being yieldable and retractable when the strike plate is inserted in the opening in the jamb and automatically projected by the spring means to engage the inner face of the jamb when the strike plate is fully inserted, and an opening formed in the strike plate through which a tool may be inserted to retract one of the slidable members to permit removal of the strike plate from the jamb.

WALTER R. SCHLAGE.